United States Patent
Delbridge et al.

(10) Patent No.: US 8,038,087 B2
(45) Date of Patent: Oct. 18, 2011

(54) SPICE GRINDERS

(76) Inventors: Patrick John Delbridge, Plumstead (ZA); David Stephen Delbridge, Tokai (ZA)

(*) Notice: Subject to any disclaimer, the term of this patent is extended or adjusted under 35 U.S.C. 154(b) by 59 days.

(21) Appl. No.: 12/513,726

(22) PCT Filed: Oct. 25, 2007

(86) PCT No.: PCT/IB2007/054331
§ 371 (c)(1),
(2), (4) Date: Oct. 26, 2009

(87) PCT Pub. No.: WO2008/056288
PCT Pub. Date: May 15, 2008

(65) Prior Publication Data
US 2010/0044485 A1   Feb. 25, 2010

(30) Foreign Application Priority Data
Nov. 10, 2006   (ZA) .................................. 2006/9348

(51) Int. Cl.
*A47J 42/34*   (2006.01)
(52) U.S. Cl. ................................. 241/169.1
(58) Field of Classification Search ............... 241/169.1
See application file for complete search history.

(56) References Cited

U.S. PATENT DOCUMENTS

| | | | |
|---|---|---|---|
| 6,196,481 B1 | 3/2001 | Barbagli | |
| 6,929,201 B1 | 8/2005 | Blouse et al. | |
| 7,284,719 B2 | 10/2007 | Delbridge et al. | |
| 2002/0117566 A1 | 8/2002 | Cheng | |
| 2005/0211806 A1* | 9/2005 | Ng | 241/169.1 |
| 2007/0210195 A1* | 9/2007 | Chapman et al. | 241/169.1 |
| 2008/0315021 A1* | 12/2008 | Tang | 241/169.1 |
| 2008/0315022 A1* | 12/2008 | Wilson et al. | 241/169.1 |

FOREIGN PATENT DOCUMENTS

| | | |
|---|---|---|
| DE | 10307930 | 9/2004 |
| WO | WO 2004/037057 | 5/2004 |

* cited by examiner

*Primary Examiner* — Faye Francis
(74) *Attorney, Agent, or Firm* — Stites & Harbison PLLC; Douglas E. Jackson

(57) ABSTRACT

A spice grinder includes a first component (12) that can be secured to the neck of a spice container, and a second component (14) that is mounted on the first component (12) for rotation with respect thereto. The first and second components (12,14) including grinding teeth (24,58) between which spice corns are ground when the second component (14) is rotated on the first component (12). Passageways are provided between the first and second components through which spice ground by the teeth emerges from the grinding gap between the teeth, and a movable shutter (16) is provided for varying the degree to which the corns are ground by varying the sizes of the passageways.

13 Claims, 5 Drawing Sheets

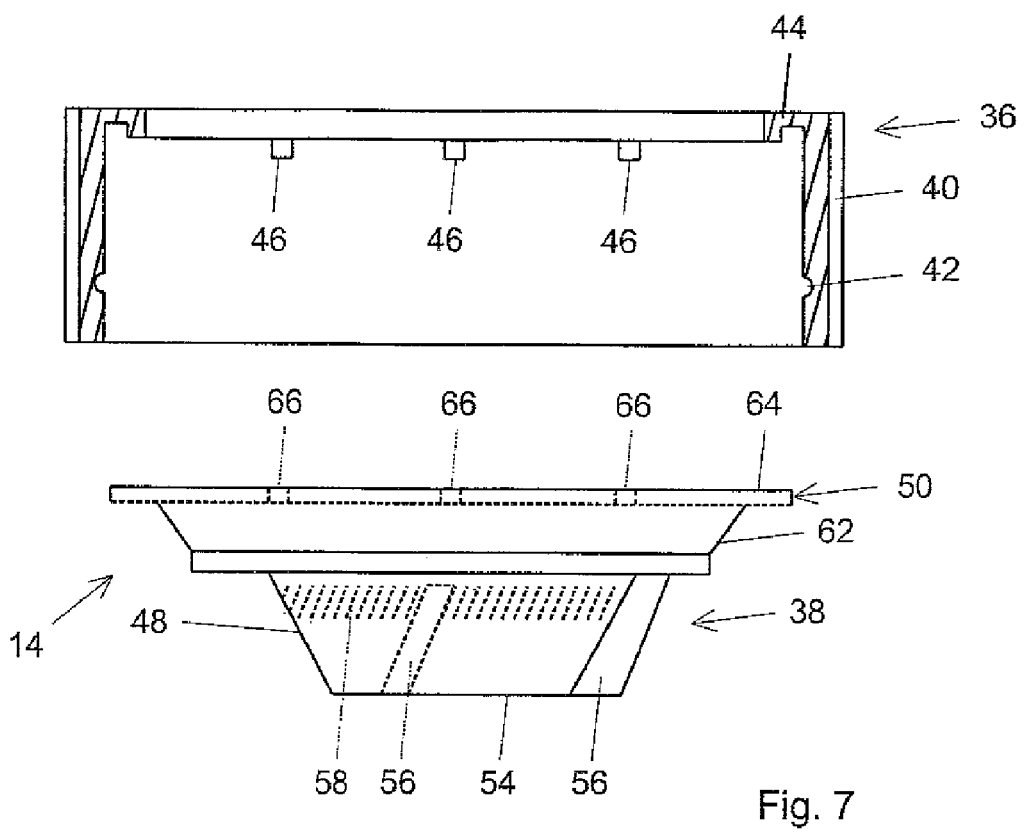
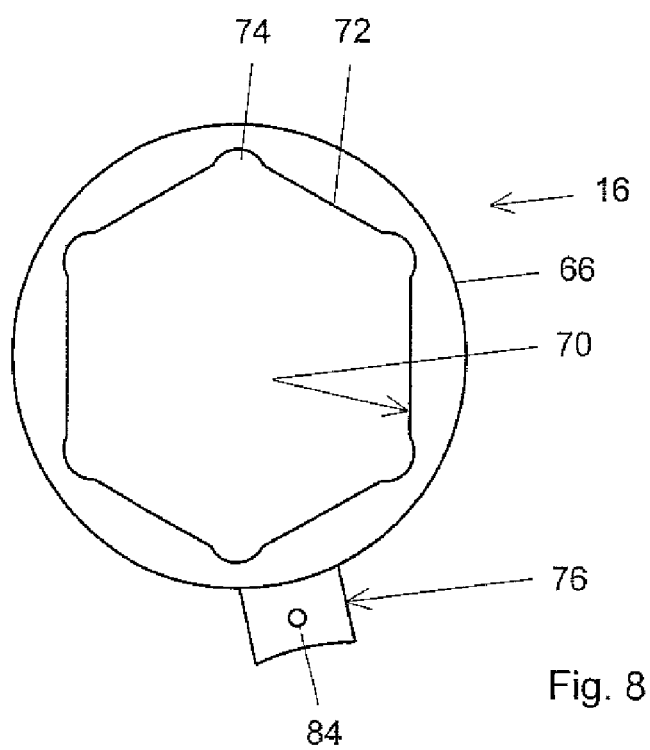
Fig. 7
Fig. 8

SPICE GRINDERS

FIELD OF THE INVENTION

This invention relates to spice grinders.

BACKGROUND TO THE INVENTION

Spice grinders are fitted to glass bottles or other containers which contain spices such as peppercorns that are to be ground immediately prior to use.

A spice grinder normally comprises a first component which has threading or other formations which enable it to be fitted to the container. The first component has a bore the surface of which is serrated, the serrations forming grinding teeth.

Within the first component there is a second, rotatable component. The outer surface of the rotatable component has teeth which lie radially inwardly of the teeth on the first component. The two sets of teeth define a grinding gap.

To enable the degree to which the spice is ground to be adjusted, the bore can be tapered and the second component can be conical. By displacing the components axially with respect to one another, the width of the grinding gap can be adjusted.

The object of the present invention is to provide a spice grinder which has an improved structure for enabling the degree to which the spice is ground to be adjusted.

BRIEF DESCRIPTION OF THE INVENTION

According to one aspect of the present invention there is provided a spice grinder comprising a first, static component which includes means by which it can be attached to the neck of a container, a second, rotatable component which fits on the first component, the first component having a bore with teeth projecting inwardly from the surface of the bore and the second component having a toothed portion thereof in said bore whereby grinding takes place in the gap between the teeth of the first and second components upon the second component being rotated with respect to the first component, passageways leading from said gap through which ground spice emerges from the grinder, and a third component constituting a shutter, the third component being displaceable with respect to said passageways thereby to enable the area of each passageway through which ground spice can fall to be varied.

Said second component can comprise spokes with openings therebetween and a cone which constitutes the centre of the second component, the spokes extending outwardly from the cone, and the teeth of the second component being on the outer surface of the cone. There can be four equally spaced large teeth on the outer surface of the cone and small teeth between the larger teeth.

According to a further aspect of the present invention there is provided a spice grinder comprising a first component including means for securing it to the neck to a spice container, a second component mounted on the first component for rotation with respect thereto, the first and second components including grinding teeth between which spice corns are ground when the second component is rotated on the first component, a plurality of apertures between the first and second components through which ground spice falls from the grinder, and a displaceable shutter for changing the aperture sizes.

The shutter is, in the preferred form of spice grinder, within the first component and displaceable in a turning movement about the axis about which said second component rotates. A tab can protrude from the outer periphery of the shutter and extend radially outwardly through a slot in the first component, there being a shutter displacing element secured to the portion of the tab which is radially outwardly of the first component. Said element can be of arcuate form and lie adjacent the radially outer surface of said first component.

Said shutter is preferably of annular form having a circular outer periphery and an inner edge the shape of which is such that some portions of said edge are further from the axis of the shutter than others. In the preferred form said inner edge has alternating straight portions and arcuate portions which form recesses between the straight portions. In one embodiment the shutter has six straight portions and six intervening arcuate portions.

BRIEF DESCRIPTION OF THE DRAWINGS

For a better understanding of the present invention, and to show how the same may be carried into effect, reference will now be made, by way of example, to the accompanying drawings in which:—

FIG. 7 illustrates the two parts of the rotatable component, a ring being shown in section and a grinding element in elevation;

FIGS. 8 and 9 are a top plan view of, and a diametral section through, a shutter.

DETAILED DESCRIPTION OF THE DRAWINGS

Figure 1:
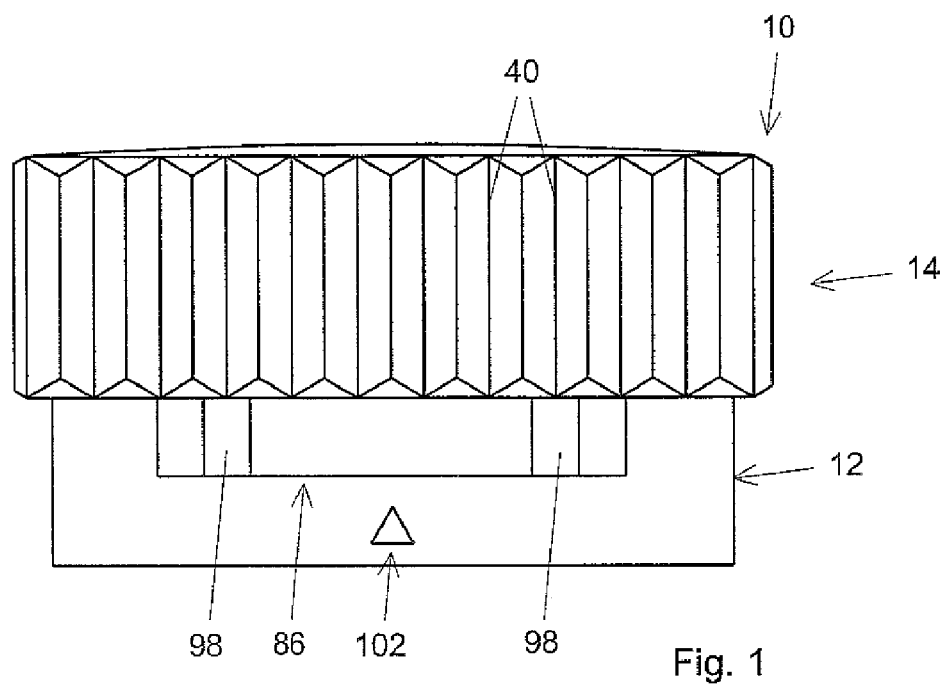
FIG. 1 is a side elevation of a spice grinder.
Figure 2:
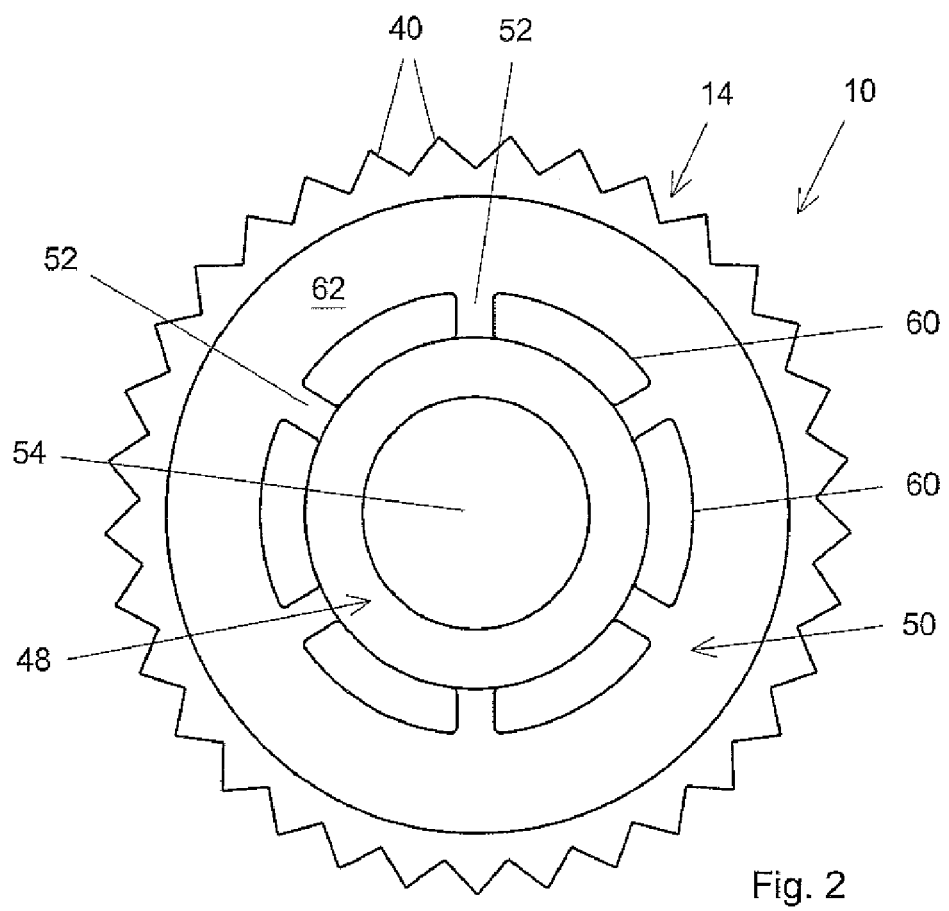
FIG. 2 is a top plan view of the spice grinder of FIG. 1.
Figure 3:
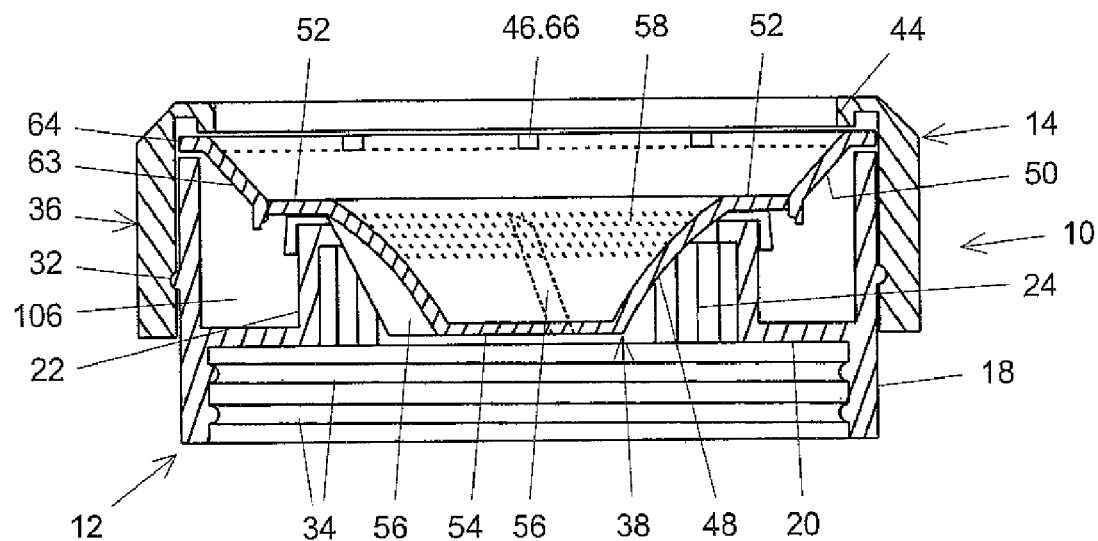
FIG. 3 is a diametral section through the spice grinder of FIGS. 1 and 2.

Referring firstly to FIGS. 1 to 3, the spice grinder illustrated is designated 10 and comprises a non-rotatable component 12 which is secured to the spice container (not shown) and a two part rotatable component 14. Between the components 12 and 14 there is a shutter 16 (which is illustrated in detail in FIGS. 8 and 9).

Figure 4:
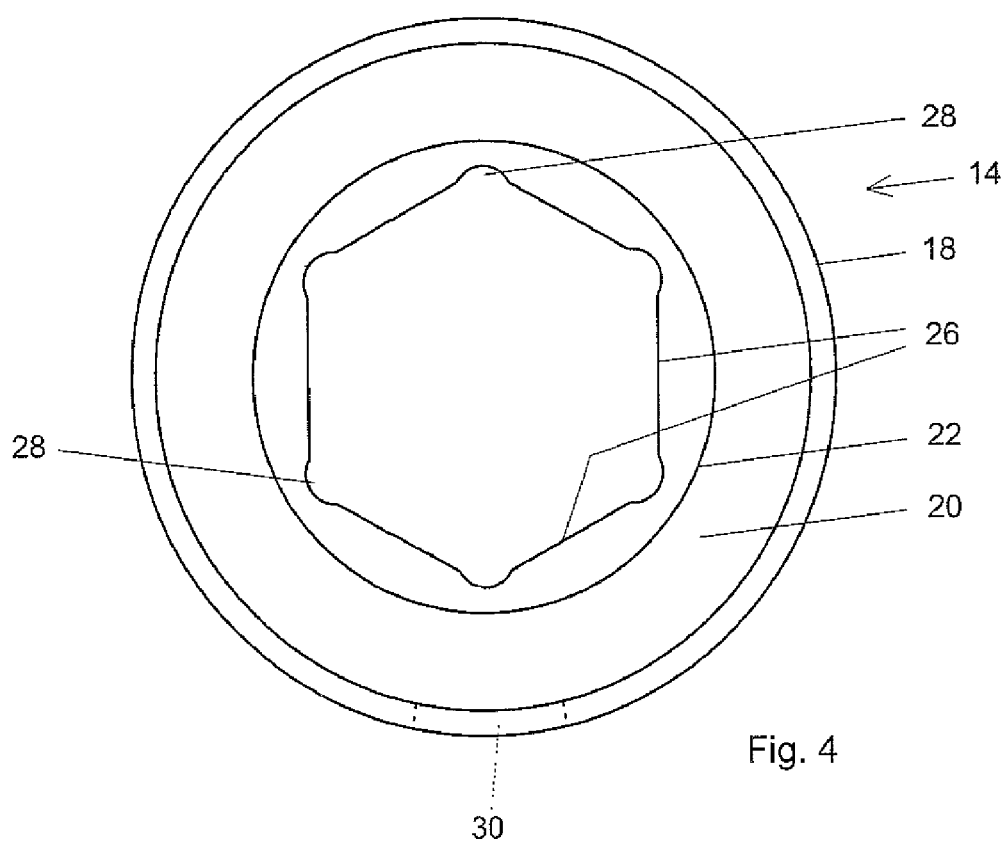
FIGS. 4 and 5 are an underneath plan view and a diametral section through the non-rotatable component of the grinder.
Figure 5:
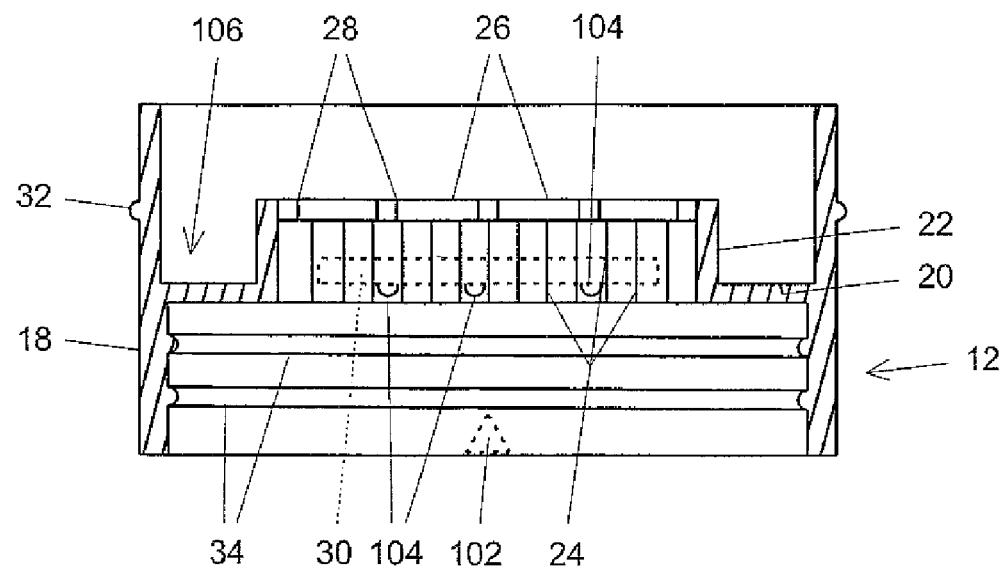

The non-rotatable component 12 (FIGS. 4 and 5) comprises an outer ring 18 and an internal annular flange 20. The inner periphery of the flange 20 is moulded integrally with a grinding sleeve 22. The sleeve 22 is internally serrated thereby to provide a circumferentially extending array of grinding teeth 24. The sleeve 22 is coaxial with the ring 18 and protrudes upwardly from the flange 20. That part of the bore of the sleeve 22 which is toothed is cylindrical.

The teeth 24 do not extend the full length of the sleeve 22 but terminate below its upper end. At its upper end the sleeve 22 is internally hexagonal thereby to provide a series of six flats 26 which form the bounding surface of the upper part of the bore. Between the flats 26 there are arcuate recesses 28.

A circumferentially elongate slot 30 is provided in the bounding wall of the ring 18 at a level immediately above the flange 20.

The ring 18 is formed externally with a circumferentially extending rib 32, the rib 32 being above the slot 30. Internally, and below the flange 20, the ring 18 is formed with threading 34, or other formations, which permit the component 12 to be secured to the spice container (not shown).

Figure 6:
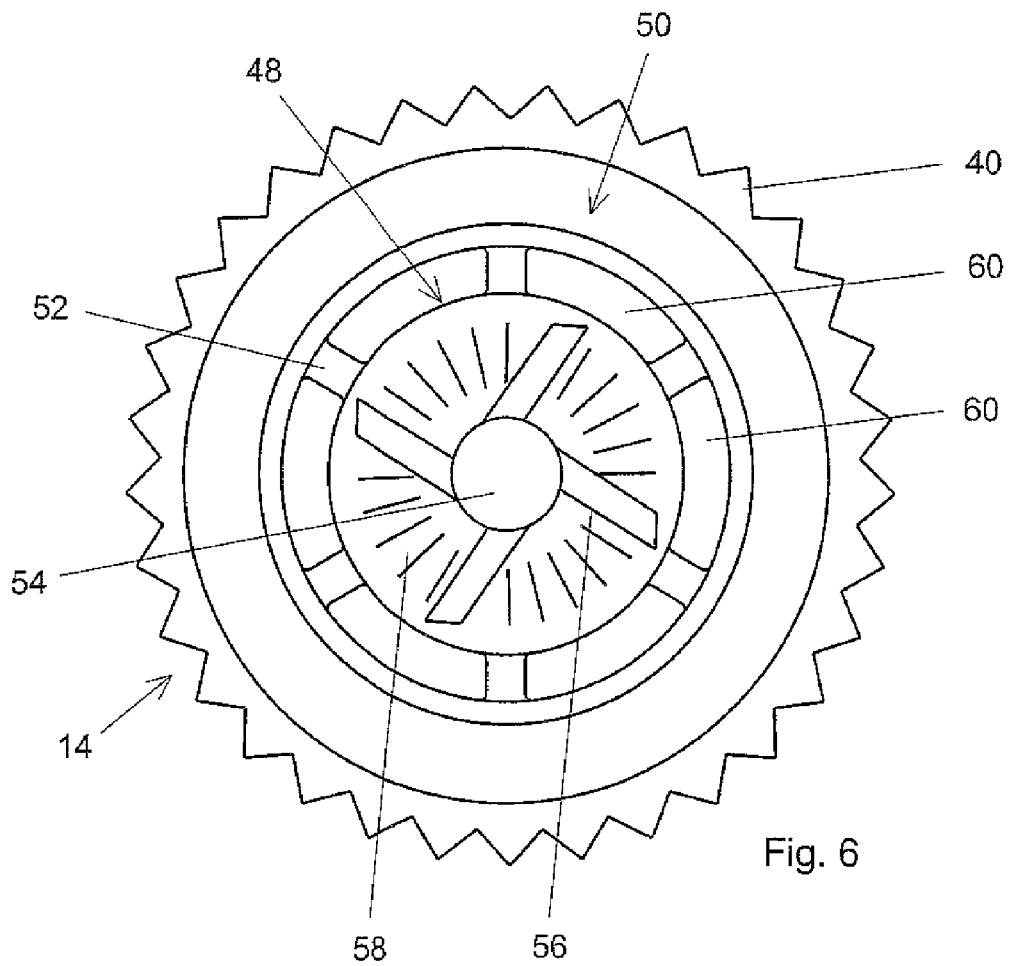
FIG. 6 is an underneath plan view of the rotatable component of the grinder.

The rotatable component 14 (FIGS. 6 and 7) comprises a ring 36 and a grinding element 38. The ring 36 is externally serrated at 40 to enable it to be gripped and turned. Internally the ring 36 has a circumferentially extending groove 42 for receiving the rib 32 when the components 12 and 14 are snap fitted together.

At its upper end the ring 36 has an internal flange 44 which is L-shaped in section and which traps the grinding element 38 between itself and the upper end of the ring 18 as best seen in FIG. 3. On the inside surface of the ring 36 and below the flange 44 there is an array of ribs 46.

The grinding element 38 comprises a central core 48 and an outer mounting structure 50, the core 48 and structure 50 being connected to one another by radially extending spokes 52 (see FIG. 2). The core 48 is closed at its lower end by a transverse wall 54 and is open at its upper end. Four large spiral grinding teeth 56 protrude outwardly from the core 48 and between the teeth 56 there are finer teeth 58. There are apertures 60 between the spokes 52 (see FIG. 2). The mounting structure 50 comprises a conical portion 62, the spokes 52 joining the wider upper end of the core 48 to the narrower lower end of the portion 62. A flange 64 encircles the wider upper end of the portion 62.

The flange 64 has a series of notches 66 in it. The ribs 46 enter the notches 66 and together form interlocking formations which ensure that the ring 36 and element 38 rotate in unison.

In a modified embodiment the ring 36 and grinding element 38 are moulded integrally with one another.

Figure 9:
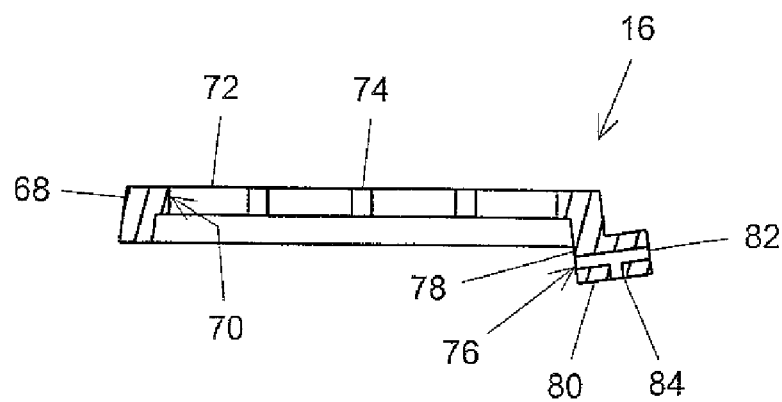

Turning now to FIGS. 8 and 9, these illustrate the shutter 16. The shutter 16 is in the form of a disc 68 which has a central opening 70. The edge of the opening 70 is constituted by alternate flats 72 and arcuate recesses 74. The shutter 16 further includes a tab 76. The tab 76 has a first portion 78 which extends downwardly, and a second portion 80 which extends radially outwardly from the lower end of the first portion. The second portion 80 has a horizontally extending slot 82 through it. A bore 84 is also provided in the second portion 80, the bore 84 opening into the slot 82 from below.

Figure 10:
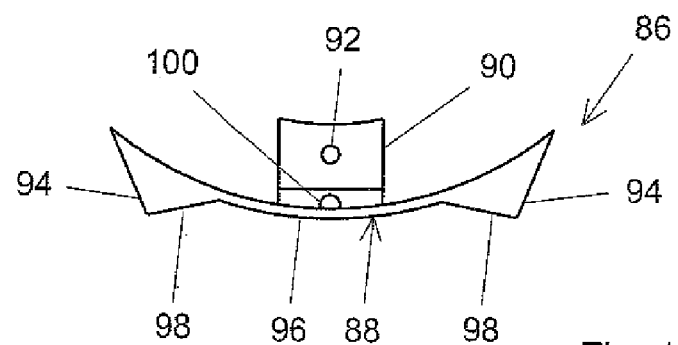
FIGS. 10 and 11 are a top plan view of, and a side elevation of, an operating member.
Figure 11:
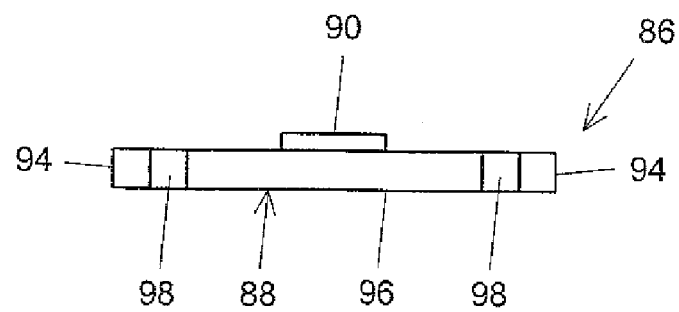

An operating member 86 is shown in FIGS. 10 and 11. The member 86 includes an arcuate portion 88 and a tab 90 which protrudes from the centre of the portion 88. The tab 90 has a protrusion 92 on the underside thereof and the portion 88 has end parts 94 which are thicker, in the horizontal direction, than its centre part 96 thereby to provide surfaces 98 that the user of the spice grinder can press on to displace the member 86. There is a detent 100 on the inner face of the portion 88 below the tab 90.

The outer surface of the ring 18 has an indicator mark 102 (FIGS. 1 and 5) below the slot 30 and which co-operates with the arcuate portion 88 as will be described. The outer surface of the ring 18 also has three indentations 104 just below the slot 30 for receiving the detent 100 thereby to locate the shutter in the position to which it has been adjusted.

The grinder is assembled by placing the shutter 16 in the upper end of the ring 18 as this is viewed in FIG. 1. The tab 90 is in the annular gap designated 106 in FIGS. 3 and 5 between the sleeve 22 and the ring 18 and is accessible through the slot 30. The shutter is supported by the sleeve 22. The member 86 is then secured to the shutter 16 by pushing the tab 90 into the slot 82. The protrusion 92 snaps into the bore 84 thereby to attach the shutter 16 to the operating member 86.

The element 38 is then placed on the shutter 16. The core 48 passes through the central opening of the shutter 16 and into the sleeve 22. The teeth 24 and 56 define a first, coarse grinding zone. The flange 64 is supported by the upper end of the ring 18. The rotatable component 14 is then pressed onto the component 12 so that the rib 32 snaps into the groove 42. The components 12 and 14 are free to rotate with respect to one another but relative axial movement is not possible. Inter-engagement between the ribs 46 and notches 66 ensures that the element 38 rotates with the ring 36.

The edge of the opening 70 in the shutter 16 lies beneath the apertures 60. The opening 70 and apertures 60 define the passageways through which ground spice falls from the inverted grinder.

As the shutter 16 is shifted in arcuate to and fro movements about the axis of the grinder, the flats 72 and recesses 74 move with respect to the flats and recesses 26 and 28 thereby varying the size of the apertures through which ground spice can fall.

Initial fracturing of the spice corns is between the teeth 24 and the larger teeth 56, and grinding to the requisite fineness occurs between the teeth 24 and the finer teeth 58.

The portion 88 of the operating member 86 has on it markings such as "min", "med" and "max" standing for minimum size, medium size and maximum size. The position of the mark 102 with respect to the markings on the portion 88 designate the fineness to which the corns are being ground. The shutter is held in its adjusted position by inter-engagement between the detent 100 and the indentations 104.

The invention claimed is:

1. A spice grinder comprising a first, static component which includes means by which it can be attached to the neck of a container, a second, rotatable component which fits on the first component, the first component having a bore with teeth projecting inwardly from the surface of the bore and the second component having a toothed portion thereof in said bore whereby grinding takes place in the gap between the teeth of the first and second components upon the second component being rotated with respect to the first component, passageways leading from said gap through which ground spice emerges from the grinder, and a third component constituting a shutter, the third component being displaceable with respect to said passageways thereby to enable the area of each passageway through which ground spice can fall to be varied.

2. A spice grinder as claimed in claim 1, wherein said second component comprises spokes with openings therebetween and a cone which constitutes the centre of the second component, the spokes extending outwardly from the cone, and the teeth of the second component being on the outer surface of the cone.

3. A spice grinder as claimed in claim 2, and including equally spaced large teeth on the outer surface of the cone and small teeth between the larger teeth.

4. A spice grinder comprising a first component including means for securing it to the neck of a spice container, a second component mounted on the first component for rotation with respect thereto, the first and second components including grinding teeth between which spice corns are ground when the second component is rotated on the first component, passageways provided between the first and second components through which spice ground by the teeth emerges from a grinding gap between the teeth, and a movable shutter which is provided for varying the degree to which the spice corns are ground by varying the sizes of said passageways.

5. A spice grinder as claimed in claim 4, wherein the shutter is within the first component and displaceable in a turning movement about the axis about which said second component rotates.

6. A spice grinder as claimed in claim 5, wherein a tab protrudes from the outer periphery of the shutter and extends radially outwardly through a slot in the first component, there being a shutter displacing element secured to the portion of the tab which is radially outwardly of the first component.

7. A spice grinder as claimed in claim 6, wherein said shutter displacing element is of arcuate form and lies adjacent the radially outer surface of said first component.

8. A spice grinder as claimed in claim 7, wherein said shutter is of annular form having a circular outer periphery and an inner edge the shape of which is such that some portions of said edge are further from the axis of the shutter than others.

9. A spice grinder as claimed in claim 8, wherein said inner edge has alternating straight portions and arcuate portions which form recesses between the straight portions.

10. A spice grinder as claimed in claim 9, wherein the shutter has six straight portions and six intervening arcuate portions.

11. A spice grinder as claimed in claim 4, wherein the first component has a bore with teeth projecting inwardly from the surface of the bore, and wherein the second component has a toothed portion thereof in said bore whereby grinding takes place in the gap between the teeth of the first and second components upon the second component being rotated with respect to the first component.

12. A spice grinder as claimed in claim 11, wherein said second component comprises spokes with openings therebetween and a cone which constitutes the centre of the second component, the spokes extending outwardly from the cone, and the teeth of the second component being on the outer surface of the cone.

13. A spice grinder as claimed in claim 12, further including equally spaced large teeth on the outer surface of the cone and small teeth between the larger teeth.

* * * * *